2,838,479

2,5-ENDOMETHYLENE-Δ³-TETRAHYDROBENZYL ACRYLATE AND POLYMERS THEREOF

Harry Biletch, Union Turnpike, N. Y., assignor to Interchemical Corporation, New York, N. Y., a corporation of Ohio No Drawing. Application April 6, 1956
Serial No. 576,518

3 Claims. (Cl. 260—86.1)

This invention relates to 2,5-endomethylene-Δ³-tetrahydrobenzyl acrylate, to polymers thereof, and to processes for their preparation.

2,5 - endomethylene - Δ³ - tetrahydrobenzyl acrylate has the formula

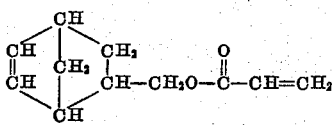

and can be prepared in over 90% yield by the alcoholysis of ethyl acrylate with 2,5-endomethylene-Δ³-tetrahydrobenzyl alcohol. This new unsaturated compound is useful as a polymerization monomer either by homopolymerization or by copolymerization with other copolymerizable monomers.

The following examples will further illustrate the invention.

EXAMPLE 1

200 gms. (2 moles) of ethyl acrylate, 124 grams of 2,5 - endomethylene - Δ³ - tetrahydrobenzyl alcohol (1 mole), 3.4 grams of tetra-n-butyl titanate and 2.2 grams of hydroquinone were placed in a reaction vessel and heated under a blanket of carbon dioxide under total reflux until the vapors at the top of a 1 foot packed reflux column wrapped with asbestos had dropped to 77.5° C. (the boiling point of the ethyl acrylate-ethanol azeotrope). Heating was continued and ethyl acrylate-ethanol azeotrope was distilled until the temperature at the head of the column began to rise indicating that the alcoholysis was complete. Excess ethyl acrylate was then distilled off at 100° C. and finally impure reaction product remaining behind was fractionated through a helices packed column to obtain a 92% yield of product boiling at 78° C. at 2–5 mm. of Hg pressure. The carbon and hydrogen analysis of this product was: carbon 74.13%, hydrogen 7.92%; calculated for $C_{11}H_{14}O_2$: carbon 74.40%, hydrogen 8.13. Specific gravity of the product was 1.026 at 25° C.; refractive index was 1.4826 at 25° C.

EXAMPLE 2

*Polymerization of 2,5 - endomethylene - Δ³ - tetrahydrobenzyl acrylate*

17.8 grams (0.1 mole) of 2,5-endomethylene-Δ³-tetrahydrobenzyl acrylate, 0.205 gram of azo-bis-isobutyronitrile, 38.5 grams of carbon tetrachloride and enough benzene to make a total volume of 125 ml. were maintained at gentle reflux (80–82° C.) under $CO_2$ for two hours to obtain about 90% yield of polymer. The polymer was soluble in the benzene-carbon tetrachloride reaction solvent but was insoluble in methyl alcohol. A film formed by applying a solution of the polymer to steel was baked at 177° C. for 30 minutes to give a completely cured film having excellent solvent resistance to such solvents as xylene and ethyl acetate.

EXAMPLE 3

*Copolymer of 2,5 - endomethylene - Δ³ - tetrahydrobenzyl acrylate and butyl acrylate*

14.2 gms. (.08 moles) of 2,5-endomethylene-Δ³-tetrahydrobenzyl acrylate, 2.56 grams (.02 mole) of butyl acrylate, 0.205 gm. of azo-bis-isobutyronitrile, 38.5 gms. of carbon tetrachloride, and enough benzene to bring up to 125 ml., is heated at gentle reflux as above for 2 hours. Coatings formed by curing films of the resulting resin at 177° C. for 30 minutes had excellent resistance to organic solvents.

I claim:

1. 2,5-endomethylene-Δ³-tetrahydrobenzyl acrylate.
2. Homopolymers of 2,5-endomethylene-Δ³-tetrahydrobenzyl acrylate.
3. Copolymers of 2,5-endomethylene-Δ³-tetrahydrobenzyl acrylate and butyl acrylate.

References Cited in the file of this patent
UNITED STATES PATENTS

| | | |
|---|---|---|
| 2,426,725 | Bruson | Sept. 2, 1947 |
| 2,557,136 | Nichols | June 19, 1951 |